April 17, 1934.   W. W. SLOANE   1,955,153
CARRIER FOR SHAKER TROUGHS
Filed Nov. 7, 1932   2 Sheets-Sheet 2
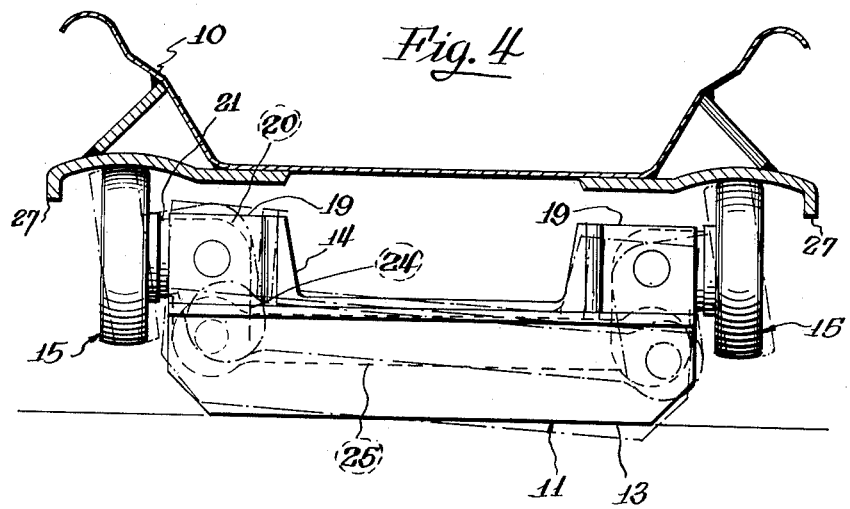
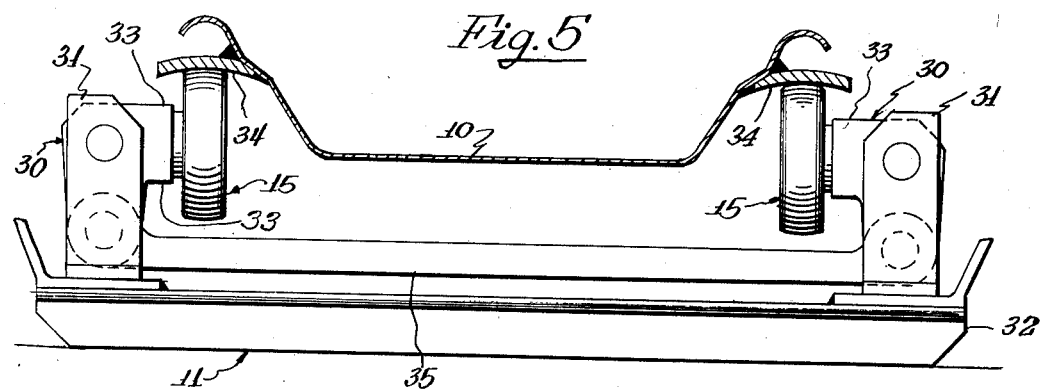
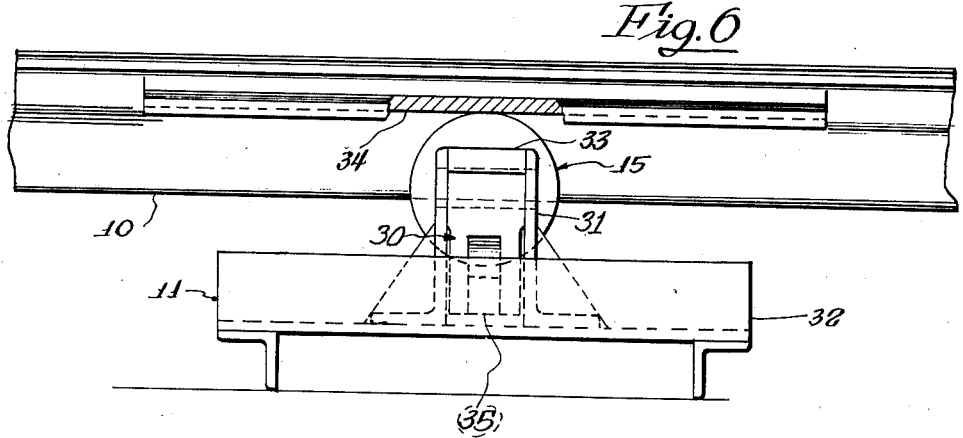
Inventor
William W. Sloane
Clarence A. Poole
Attorney Patented Apr. 17, 1934

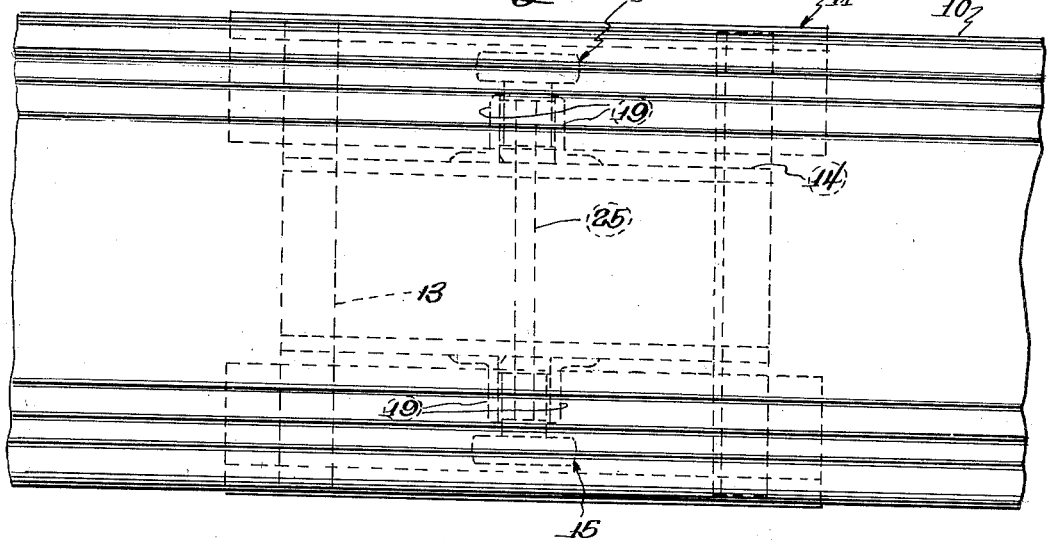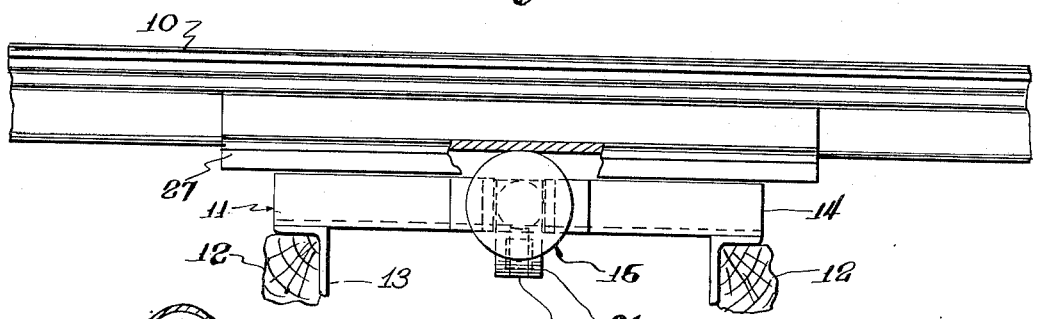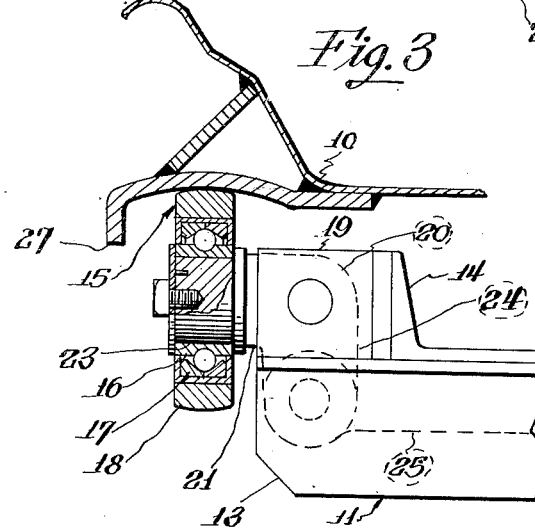

1,955,153

UNITED STATES PATENT OFFICE 1,955,153

CARRIER FOR SHAKER TROUGHS

William W. Sloane, Chicago, Ill., assignor to Goodman Manufacturing Company, Chicago, Ill., a corporation of Illinois Application November 7, 1932, Serial No. 641,541

12 Claims. (Cl. 198—220)

This invention relates to improvements in carriers for shaker conveyor troughs and has among other objects to provide a carrier for shaker conveyor troughs of a new and improved construction wherein said conveyor trough may be carried when said carrier is inclined at angles both longitudinally and transversely with respect to said trough permitting said carrier to be placed on an uneven mine bottom and carry the trough for reciprocable movement with respect thereto.

My invention may be more clearly understood with reference to the accompanying drawings wherein:

Figure 1 is a top plan view of the conveyor trough supported on a carrier constructed in accordance with my invention;

Figure 2 is a side elevation of the device shown in Figure 1 with parts broken away and in section;

Figure 3 is an enlarged partial fragmentary transverse sectional view showing several of the details of my invention;

Figure 4 is an enlarged front end view of the device embodying my invention showing the conveyor trough in section;

Figure 5 is a front end view of a modifitd form of carrier constructed in accordance with my invention showing a conveyor trough in section; and Figure 6 is a side elevation of the device shown in Figure 5 with parts broken away and in section.

Like numerals refer to like parts throughout the various figures.

Referring now in particular to the details of the drawings, the device embodying my invention includes a conveyor trough 10 supported on a carrier, generally indicated by reference character 11. The conveyor trough 10 is of an ordinary construction, so will not herein be shown or described in detail, and is reciprocated at accelerated and retarded speeds in a usual manner for moving material, such as coal, therealong by means of a suitable reciprocatory drive mechanism which may be of any type well known to those skilled in the art and is not herein shown since it forms no part of my present invention.

The carrier 11 includes a suitable frame member adapted to rest on the ground or be supported on suitable supporting means, such as mine ties 12, 12, and comprises a pair of parallel spaced members, herein preferably shown as being angle irons 13, 13, extending transversely of the conveyor trough 10 and connected together by means of a member 14 extending generally longitudinally of the conveyor trough 10 and preferably having its longitudinal axis coincident with a vertical plane parallel with and intersecting the longitudinal axis of said conveyor trough. The member 14 may be of any form, but is herein preferably shown as being a channel iron having the rearward face of its web resting on the angle irons 13, 13 and having its flanges extending upwardly from said angle irons. The angle irons 13, 13 are so arranged that one of their legs extends downwardly while their opposite legs extend outwardly from the transverse center line of the carrier 11, so said angle irons may engage and be secured to the mine ties 12, 12 in a suitable manner, which ties may in turn be held from movement with respect to the mine floor by suitable mine jacks in a usual manner.

Suitable anti-friction roller devices 15, 15 are provided for carrying the conveyor trough 10 on the carrier 11, which anti-friction roller devices are mounted on said carrier for rotation about axes extending transversely of said carrier and for pivotal movement about axes extending generally longitudinally of said carrier and spaced from said anti-friction roller devices.

The anti-friction roller devices 15 may be of any suitable construction, but are herein preferably shown as being of the ball bearing type, and include an inner race 16, an outer race 17, suitable anti-friction means interposed between said inner and outer races and a housing 18 therefor, which housing forms the rolling means of said anti-friction roller devices.

The means for supporting the anti-friction roller devices 15, 15 on the carrier 11 includes suitable brackets, herein shown as comprising parallel spaced angle irons 19, 19, equally spaced on opposite sides of the transverse center line of the carrier 11 and having one of their legs secured to and abutting the outer sides of the flanges of the connecting member 14 in a suitable manner, such as welding. The opposite legs of the angle irons 19, 19 extend outwardly from the flange of the member 14 and are adapted to provide a pivotal support for bell crank members 20, 20.

One lever arm 21 of each bell crank member 20 is adapted to extend outwardly from the bracket formed by the angle irons 19, 19 and has a stud 23 formed integral therewith on which is mounted the anti-friction roller device 15.

Another lever arm 24 of each bell crank member 20 is adapted to extend downwardly from the axis of pivotal connection of said bell crank member to the angle irons 19, 19. The lever arms 24, 24 of the bell crank members 20, 20 are connected together for simultaneous pivotal movement about their axes of pivotal connection to the brackets formed by the parallel spaced angle irons 19, 19 by means of a transversely extending bar 25 pivotally connected to said lever arms adjacent its opposite ends.

The outer periphery of the housings 18 of the anti-friction roller devices 15, 15 are convexly curved to conform substantially to the curvature of inverted concavely curved track members 27, 27 ridable thereon. The inverted track members 27, 27 are secured to and extend longitudinally of and outwardly from opposite sides of the conveyor trough 10 in a suitable manner, such as welding (see Figs. 2, 3, and 4). Thus the inverted track members 27, 27 may ride on the anti-friction roller devices 15, 15 when said roller devices are tilted about axes extending longitudinally thereof.

With reference now to Figure 4 in particular, it may be seen that when the carrier 11 is tilted about an axis extending longitudinally thereof, or when the conveyor trough 10 is tilted about a similar axis, that one of the anti-friction roller devices 15 will be moved about the axis of pivotal connection of the respective bell crank member 20 to the angle irons 19, 19 and that the opposite bell crank member 20 will be moved about its axis of pivotal connection to the carrier 11 by means of the transversely extending bar 25. Thus when one anti-friction roller device 15 is depressed, the other will be raised and vice versa. With such an arrangement the conveyor trough 10 may be effectively carried when the carrier 11 is on an uneven mine bottom and more particularly a mine bottom which is uneven in such a manner that the carrier 11 is tilted about axes extending longitudinally and transversely thereof.

Referring now to the modified form of my invention as shown in Figures 5 and 6, the principle of operation is the same as that shown in Figures 1 to 4, inclusive, with the exception that the conveyor trough 10 and carrier 11 are arranged with a view towards operation in spaces of restricted vertical height. In this form of my invention, bell crank members 30, 30 are pivotally supported on suitable supporting brackets 31, 31 secured to and extending upwardly from a carrier frame 32. The bell crank members 30, 30 have inwardly extending lever arms 33, 33 on which are journaled the anti-friction roller devices 15, 15. The faces of the anti-friction roller devices 15, 15 are concavely curved and are similarly adapted to have convexly curved inverted tracks 34, 34 ridable thereon, which tracks are secured to and extend outwardly from the conveyor trough 10 above the lower portion thereof. The lower lever arms of the bell crank members 30, 30 are connected together by a transversely movable bar 35 so movement of one of said bell crank members about its axis of pivotal connection to the carrier 11 will move the opposite bell crank member 30 in a similar direction and support the conveyor trough 10 when the carrier 11 is tilted with respect thereto about an axis extending generally longitudinally of the conveyor trough 10 as well as when tilted about an axis extending transversely of said conveyor trough.

It may now be seen that a new and improved carrier for conveyor troughs has been provided wherein the roller devices, which carry the trough, are carried by a suitable equalizing mechanism to effect a support for said carrier when tilted laterally with respect to said conveyor trough and which also effects an efficient support for said conveyor trough when tilted about an axis extending generally transversely thereof, and that this carrier is of a simplified, compact construction and may be particularly adapted for use in places of restricted vertical height.

While I have herein shown and described one form in which my invention may be embodied, it will be understood that the construction and arrangement of the various parts may be altered or changed without departing from the spirit or scope of the invention. Furthermore, I do not wish to be construed as limiting myself to the specific embodiment illustrated, excepting as it may be limited in the appended claims.

I claim as my invention:

1. In a shaker conveyor, the combination with a conveyor trough, an anti-friction carrier for carrying said conveyor trough when the bottom on which said carrier rests is inclined both transversely and longitudinally with respect to said trough comprising a frame member, a plurality of roller devices supported thereon at opposite sides thereof, inverted track means on said conveyor trough riding on said roller devices, means for supporting said roller devices for movement about axes extending generally longitudinally of said conveyor trough, and means for connecting said roller devices together whereby movement of one of said roller devices about one of said longitudinal axes will cause movement of the other of said roller devices about the other of said longitudinal axes.

2. In a shaker conveyor, the combination with a conveyor trough, an anti-friction carrier for carrying said conveyor trough when the bottom on which said carrier rests is inclined both transversely and longitudinally with respect to said trough comprising a frame member, a plurality of roller devices supported thereon at opposite sides thereof, track means on said conveyor trough riding on said roller devices, means for supporting said roller devices for movement about axes extending generally longitudinally of said conveyor trough, and means for connecting said roller devices together whereby movement of one of said roller devices about one of said longitudinal axes will cause movement of the other of said roller devices about the other of said longitudinal axes comprising a transversely movable member.

3. In a shaker conveyor, the combination with a conveyor trough, an anti-friction carrier for carrying said conveyor trough when the bottom on which said carrier rests is inclined both transversely and longitudinally with respect to said trough comprising a frame member, a plurality of roller devices supported thereon at opposite sides thereof, inverted track means on said conveyor trough riding on said roller devices, means for supporting said roller devices for movement about axes extending generally longitudinally of said conveyor trough, and means for connecting said roller devices together whereby movement of one of said roller devices about one of said longitudinal axes will cause movement of the other of said roller devices about the other of said longitudinal axes comprising a transversely movable bar spaced from the axes of pivotal movement of said roller devices.

4. In a shaker conveyor, the combination with a conveyor trough, an anti-friction carrier for carrying said conveyor trough when the bottom on which the carrier rests is inclined both transversely and longitudinally with respect to said trough comprising a frame member, a plurality of roller devices supported thereon at opposite sides thereof, track means on said conveyor trough riding on said roller devices, means for supporting said roller devices for movement about axes extending generally longitudinally of said conveyor trough, and means for connecting said roller devices together whereby movement of one of said roller devices about one of said longitudinal axes will cause movement of the other of said roller devices about the other of said longitudinal axes comprising a transversely movable member spaced beneath the axes of pivotal movement of said roller devices.

5. In a shaker conveyor, the combination with a conveyor trough, an anti-friction carrier for said conveyor trough comprising a frame member, a plurality of bell crank members supported for pivotal movement about parallel axes extending generally longitudinally of said conveyor trough, a roller device supported on one lever arm of each of said bell crank levers for rotation about axes extending generally transversely of said conveyor trough, and a transversely movable member connecting the other lever arms of said bell crank members together.

6. In a shaker conveyor, the combination with a conveyor trough, an anti-friction carrier for said conveyor trough comprising a frame member, a bell crank lever supported on said frame member adjacent each side of said conveyor trough for pivotal movement about an axis extending generally longitudinally of said conveyor trough, a roller device supported on one lever arm of each of said bell crank levers for rotation about an axis disposed perpendicularly to said longitudinal axis, guide means on said conveyor trough ridable on said roller devices, and a transversely movable member for connecting the other lever arms of said bell crank members together.

7. In a shaker conveyor, the combination with a conveyor trough, an anti-friction carrier for said conveyor trough comprising a frame member, a bell crank lever supported on said frame member adjacent each side of said conveyor trough for pivotal movement about an axis extending generally longitudinally of said conveyor trough, a roller device supported on one lever arm of each of said bell crank levers for rotation about an axis disposed perpendicularly to said longitudinal axis, guide means on said conveyor trough ridable on said roller devices, and a transversely movable member disposed beneath said longitudinal axes for connecting the other lever arms of said bell crank members together.

8. In a shaker conveyor, the combination with a conveyor trough, an anti-friction carrier for said conveyor trough comprising a frame member, a bell crank lever supported on said frame member adjacent each side of said conveyor trough for pivotal movement about an axis extending generally longitudinally of said conveyor trough, a roller device supported on one lever arm of each of said bell crank levers for rotation about an axis disposed perpendicularly to said longitudinal axis, guide means on said conveyor trough disposed above the bottom portion thereof ridable on said roller device, and a transversely movable bar for connecting the other lever arms of said bell crank members together.

9. In a shaker conveyor, the combination with a conveyor trough, an anti-friction carrier for said conveyor trough comprising a frame member, a bell crank lever supported on said frame member adjacent each side of said conveyor trough for pivotal movement about an axis extending generally longitudinally of said conveyor trough, a roller device supported on one lever arm of each of said bell crank levers for rotation about an axis disposed perpendicularly to said longitudinal axis, guide means on said conveyor trough disposed above the bottom portion thereof ridable on said roller devices, and a transversely movable bar disposed beneath said roller devices for connecting the other lever arms of said bell crank members together.

10. In combination with a shaker conveyor, a conveyor trough, an anti-friction carrier for said conveyor trough comprising a frame member, a pair of roller devices supported thereon for rotation about axes disposed transversely of said conveyor trough and for pivotal movement about axes extending substantially longitudinally of said conveyor trough, means for connecting said roller devices together whereby movement of one of said roller devices about a longitudinal axis will move said other roller device in the same direction, inverted track members on said conveyor trough ridable on said roller devices, the portion of said track members ridable on said roller devices being of a concave contour and the faces of said rollers being of a convex contour.

11. In combination with a shaker conveyor, a conveyor trough, an anti-friction carrier for said conveyor trough comprising a frame member, a pair of roller devices supported thereon for rotation about axes disposed transversely of said conveyor trough, inverted track members extending longitudinally of and outwardly from opposite sides of said conveyor trough ridable on said roller devices, the portion of said track members ridable on said roller devices being of a concave contour and the faces of said rollers being of a convex contour and said roller devices being connected together for simultaneous movement about axes extending generally longitudinally of said conveyor trough.

12. In combination with a shaker conveyor, a conveyor trough, an anti-friction carrier for said conveyor trough comprising a frame member, a pair of roller devices supported thereon for rotation about axes disposed transversely of said conveyor trough, inverted track members extending longitudinally of and outwardly from opposite sides of said conveyor trough ridable on said roller devices, the portion of said track members ridable on said roller devices being of a concave contour and the faces of said rollers being of a convex contour and said roller devices being connected together for simultaneous movement about axes extending generally longitudinally of said conveyor trough and spaced from said roller devices.

WILLIAM W. SLOANE.